(12) United States Patent
Kourai et al.

(10) Patent No.: US 6,613,828 B1
(45) Date of Patent: Sep. 2, 2003

(54) ANTIBACTERIAL ACRYLONITRILE FIBER HAVING PHOTOCATALYTIC ACTIVITY

(75) Inventors: Hiroki Kourai, Tokushima (JP); Hideo Naka, Okayama (JP)

(73) Assignee: Japan Exlan Company Limited, Osaka (JP)

( * ) Notice: Subject to any disclaimer, the term of this patent is extended or adjusted under 35 U.S.C. 154(b) by 238 days.

(21) Appl. No.: 09/665,954

(22) Filed: Sep. 21, 2000

(30) Foreign Application Priority Data

Sep. 22, 1999 (JP) .............................. 11-267928

(51) Int. Cl.⁷ .................................. C08K 3/10
(52) U.S. Cl. ...................... 524/403; 524/428
(58) Field of Search ................... 524/403, 428

(56) References Cited

U.S. PATENT DOCUMENTS 3,734,897 A  *  5/1973  Stoy

FOREIGN PATENT DOCUMENTS

| JP | 52-92000 | 8/1977 |
| JP | 3-199418 | 8/1991 |
| JP | 7-243169 | 9/1995 |

* cited by examiner

*Primary Examiner*—Bernard Lipman
(74) *Attorney, Agent, or Firm*—Wenderoth, Lind & Ponack, L.L.P.

(57) ABSTRACT

It is disclosed that an antibacterial acrylonitrile fiber having a photocatalytic activity in which an acrylonitrile fiber containing an antibacterially active metal compound is subjected to a heat treatment within a range of pH 1–6.

8 Claims, No Drawings

ANTIBACTERIAL ACRYLONITRILE FIBER HAVING PHOTOCATALYTIC ACTIVITY

TECHNICAL FIELD OF THE INVENTION

The present invention relates to an antibacterial acrylonitrile fiber having the so-called photocatalytic activity where the antibacterial property is significantly improved under the condition of being irradiated with light.

PRIOR ART

As result of the recent progress in ripening and aging in the society and also in tendency of seeking the wealthy and pleasant life environment, there has been an increasing demand for maintenance and promotion of health and the appearance of clothing, bedclothes, interior products or daily commodities having clearer and more pleasant antibacterial property has been demanded.

As one of the means for giving an antibacterial property, silver ion or copper ion has been known to exhibit an excellent antibacterial property and some methods for giving an antibacterial property to fiber utilizing the characteristics of such a metal ion has been known. For example, as mentioned in the Japanese Laid-Open Patent Publications Sho-52/92000 and Hei-03/199418 as the methods for giving silver ion to an acrylonitrile fiber, there are means for providing an antibacterial acrylonitrile fiber where, in an acrylonitrile fiber having ion-exchange groups such as sulfonic acid group, carboxylic acid group and hydroxyl group, silver ion or copper ion is bonded to a part of or all of the said ion-exchange groups so that it is made remained as metal silver or copper or as a compound of the said metal.

In such a method however, although a antibacterial property is available to some extent, the product does not well meet with the recent requirement as antibacterial property and there is a problem that, in order to promote the antibacterial property, the amount of silver or copper ion to be contained in the antibacterial acrylonitrile fiber is to be increased.

PROBLEMS TO BE SOLVED BY THE INVENTION

An object of the present invention is to provide an antibacterial acrylonitrile fiber having the so-called photocatalytic activity where the antibacterial property can be promoted by means of light irradiation without increasing the amount of the antibacterially active metal compound.

MEANS FOR SOLVING THE PROBLEM

The present inventors have carried out an intensive study for the means for improving the antibacterial property of antibacterial fiber. As a result, they have found that the above problems can be solved when an acrylonitrile fiber containing an antibacterially active metal compound is subjected to a heat treatment within a range of pH 1–6 and have accomplished the present invention. Thus, the present invention relates to an antibacterial acrylonitrile fiber having a photocatalytic activity in which an acrylonitrile fiber containing an antibacterially active metal compound is subjected to a heat treatment within a range of pH 1–6.

The object of the present invention can be also appropriately achieved by the embodiments where, in the antibacterial acrylonitrile fiber having a photocatalytic activity, the antibacterial metal compound is a silver compound, the acrylonitrile fiber has an anionic functional group and the heat treatment is wet heat or dry heat of 100–160° C.

Best Mode for Carrying Out the Invention Now the present invention will be illustrated in detail as hereunder. With regard to the acrylonitrile fiber containing the antibacterially active metal compound used in the present invention, there is no particular limitation so far as it is a fiber which is formed from an acrylonitrile polymer and contains an antibacterially active metal compound. As to such an acrylonitrile polymer, it is preferred to use a copolymer of 60% by weight or more or, more preferably, 80% by weight or more of acrylonitrile with known monomers.

There is no particular limitation for the comonomer used for the copolymerization so far as it is copolymerizable with acrylonitrile such as other polymerizable unsaturated vinyl compounds. Thus, its examples are vinyl esters such as vinyl acetate; vinyl or vinylidene halides such as vinyl chloride, vinyl bromide and vinylidene chloride; lower alkyl esters of (meth)acrylic acid [hereinafter, "(meth)acrylic" means both acrylic and methacrylic] such as methyl acrylate and methyl methacrylate; acrylamide; styrene; monomers containing a sulfonic acid group such as sodium methallylsulfonate, 2-acrylamido-2-methylpropanesulfonic acid, sodium p-styrenesulfonate and sodium vinylsulfonate; and monomers containing carboxylic acid group such as (meth)acrylic acid and maleic acid and, in order to effectively contain the antibacterially active metal compound, it is preferred that a monomer containing anionic functional group such as a monomer containing sulfonic acid group or carboxylic acid group is present in an amount of 0.1–20% by weight.

With regard to an antibacterially active metal compound, although there is no particular limitation so far as it is a metal compound having an antibacterial activity, a silver compound is preferred so that a photocatalytic activity is effectively given. Here, although there is no particular limitation for the amount of the antibacterially active metal compound to be contained in the fiber in the present invention, the amount is more preferably 1–200 m.mol/kg as a metal ion to the fiber. Thus, the content of the metal compound varies depending upon the required level of the antibacterial property and, when the amount is less than the lower limit of the range, it is difficult to achieve a noticeable photocatalytic activity in a life environment and a sufficient antibacterial property accompanied thereby while, when it is more than the upper limit, it is apt to cause a problem of a significant coloring in the heating treatment of the fiber such as drying. Further, within such a range, a sufficient antibacterial property due to the photocatalytic activity can be always achieved to daily use or industrial use and, accordingly, it results in an unnecessarily high cost and is not industrially advantageous when the metal compound is contained in more amount than the above range.

With regard to a method of making such an antibacterially active metal compound contained in an acrylonitrile fiber, there is no particular limitation and examples of such a method are a method disclosed in the Japanese Laid-Open Patent Publication Hei-03/199418 where, in the manufacture of an acrylonitrile fiber, fiber in a gel structure before drying and heat-relaxing steps is continuously treated with an aqueous solution of an antibacterially active metal salt so that the antibacterially active metal salt is made contained in the fiber and a method disclosed in the Japanese Laid-Open Patent Publications Sho-52/92000 and Hei-07/243169 where an acrylonitrile fiber is manufactured by a conventional method and then subjected to an after-treatment so that an antibacterially active metal compound is made contained therein.

In the present invention, it is necessary that the acrylonitrile fiber containing the antibacterially active metal compound manufactured as such is subjected to a heat treatment at a range of pH 1–6 or, preferably, pH 2–4. Although there is no particular limitation for the said heat treatment, a method of treating with wet heat or dry heat of 100–160° C. is preferred and its examples are a method where an acrylonitrile fiber containing the antibacterially active metal compound is impregnated in an acidic aqueous solution of pH 1–6, water is drained off therefrom and the fiber is subjected to a wet heat treatment by steam in an autoclave and a method where the fiber wherefrom water is drained off is immediately subjected to a dry heat treatment using a hot air drier. The treating time is set depending upon the treating temperature.

When the pH at this heat treatment stage is less than 1, physical property of the fiber is significantly deteriorated while, when it is more than 6, the photocatalytic activity is not given whereby the present invention is not achieved. When the heat treating temperature is lower than 100° C., the treating time becomes long and that is not an industrially advantageous method while, when it is higher than 160° C., physical property of the acrylonitrile fiber is deteriorated.

EXAMPLES

In order to make the understanding of the present invention easier, examples will be given as hereunder although they are merely to exemplify the present invention and the essential feature of the present invention is not limited by them. Unless otherwise mentioned, the terms "part(s)" and "%" in the examples are those by weight. Incidentally, the metal ion content and antibacterial property mentioned in the examples are measured by the following methods.

(1) Metal Ion Content

Fiber of 0.1 gr was subjected to a wet decomposition using 95% concentrated sulfuric acid and 62% nitric acid and an atomic absorption of the resulting solution was measured using an Atomic Absorption Spectrometric Apparatus (AA 855) manufactured by Nippon Jarrell-Ash Co., Ltd.

(2) Antibacterial Property

A bacterial suspension was prepared so as to make the cell numbers of Staphylococcus aureus $1.5-3.0\times10^6$/ml and used as a test bacterial solution. Test fiber (0.2 g) and 20 ml of the test bacterial solution were placed in an Erlenmeyer flask and shaken at 30° C. for 30 minutes and living cell numbers were measured to calculate the residual living cell rate (Log $S(\%)$). Here, the residual living cell rate is calculated by the following equation where A is cell numbers of the test bacterial solution added thereto and B is those after shaking for 30 minutes.

Residual Living Cell Rate (Log $S(\%)$)=Log[$(B/A)\times 100$]

When the residual living cell rate is 2, that means there is no antibacterial property at all while, when it is −2, that means a strong antibacterial property (99.99% of the bacteria died) is available.

Incidentally, in order to investigate the photocatalytic activity of the present invention, the above-mentioned shaking at 30° C. was carried out under irradiation of light (using a tungsten lamp of 100 watts/100 volts) and also in a dark room and the value calculated by deducting the residual living cell rate under light irradiation from that in a dark room is used as a residual living cell rate difference. Value of the said residual living cell rate difference is a parameter for expressing the photocatalytic activity and the more the said value, the higher the photocatalytic activity.

Manufacturing Example 1 for Acrylonitrile Fiber containing Antibacterially Active Metal.

An acrylonitrile polymer consisting of 91.1% of acrylonitrile, 8.6% of methyl acrylate and 0.3% of sodium methallylsulfonate prepared by a conventional polymerization was dissolved in a 45% aqueous solution of sodium rhodanide to prepare a solution for spinning where the polymer concentration was 12%. The said solution was extruded into a 10% aqueous solution of sodium rhodanide of −3° C. using a known nozzle and then washed with water, elongated and subjected to a heat treatment to prepare an acrylonitrile fiber (fiber A). Then, in order to introduce silver which is an antibacterially active metal into the said fiber, 100 g of the fiber A were poured over a solution which was prepared by adjustment of 1000 ml of aqueous solution of silver nitrate of 20 m.mol/liter to pH 3 using a 1% aqueous solution of nitricacid, treated at 98° C. for 10 minutes, washed with water, dried, poured over 1000 ml of an aqueous solution of sodium oxalate of 10 m.mol/liter, treated at 98° C. for 10 minutes, washed with water and dried to give an acrylonitrile fiber (fiber B) containing an antibacterially active metal.

Manufacturing Example 2 for Acrylonitrile Fiber containing Antibacterially Active Metal.

The same operation as in the above Manufacturing Example 1 was carried out except that an acrylonitrile polymer consisting of 95% of acrylonitrile and 5% of vinyl acetate was used and the treating time using an aqueous solution of silver nitrate was 30 minutes to prepare an acrylonitrile fiber (fiber C) containing an antibacterially active metal.

Examples 1–5 and Comparative Examples 1–3

The above-prepared acrylonitrile fiber containing an antibacterially active metal (fiber B, fiber C) was impregnated in an aqueous solution where pH was adjusted by nitric acid, water was drained off, the fiber was then placed in an autoclave (when the heat treating temperature was higher than 100° C.) or in a hot air drier (when the heat treating temperature was 100° C. or lower) and subjected to a heat treatment at the pH and the temperature as shown in Table 1 to prepare six kinds of fibers of Examples 1–5 and Comparative Example 3. Meanwhile, Comparative Examples 1 and 2 were the acrylonitrile fiber (fiber A) containing an antibacterially active and the acrylonitrile fiber (fiber B) containing an antibacterially active metal, respectively, of the Manufacturing Example 1.

TABLE 1

| No. | Type of the Fiber | pH at the Heat Treatment | Heat Treating Temp (° C.) | Metal | Amount of Anionic Functional Group (%) |
|---|---|---|---|---|---|
| Example 1 | Fiber B | 1 | 120 | Ag | 0.50 |
| Example 2 | Fiber B | 3 | 120 | Ag | 0.50 |
| Example 3 | Fiber B | 3 | 95 | Ag | 0.50 |
| Example 4 | Fiber C | 3 | 150 | Ag | (none) |
| Example 5 | Fiber C | 3 | 170 | Ag | (none) |
| Comp. Ex. 1 | Fiber A | (none) | (none) | (none) | 0.50 |
| Comp. Ex. 2 | Fiber B | (none) | (none) | Ag | 0.50 |
| Comp. Ex. 3 | Fiber B | 7 | 105 | Ag | 0.50 |

The fibers of Examples 1–5 and Comparative Examples 1–3 prepared as such were subjected to a measurement for metal ion content and to a calculation for antibacterial property expressed by residual living cell rate under light irradiation and in dark room and for photocatalytic activity expressed by residual living cell rate difference. The result is shown in Table 2.

TABLE 2

| No. | Metal Ion Content (mmol/kg) | Test Condition for Antibacterial Property | Residual Living Cell Rate (Log S (%)) | Residual Living Cell Rate Difference |
|---|---|---|---|---|
| Example 1 | 42 | Light Irradiation | −2.4 | 1.8 |
|  |  | Dark Room | −0.6 |  |
| Example 2 | 43 | Light Irradiation | −2.7 | 1.9 |
|  |  | Dark Room | −0.8 |  |
| Example 3 | 43 | Light Irradiation | −2.2 | 1.6 |
|  |  | Dark Room | −0.6 |  |
| Example 4 | 39 | Light Irradiation | −2.0 | 1.2 |
|  |  | Dark Room | −0.8 |  |
| Example 5 | 40 | Light Irradiation | −2.0 | 1.3 |
|  |  | Dark Room | −0.7 |  |
| Comp. Ex. 1 | 0 | Light Irradiation | −2.0 | 0.0 |
|  |  | Dark Room | −2.0 |  |
| Comp. Ex. 2 | 44 | Light Irradiation | −0.6 | 0.1 |
|  |  | Dark Room | −0.5 |  |
| Comp. Ex. 3 | 43 | Light Irradiation | −0.8 | 0.2 |
|  |  | Dark Room | −0.6 |  |

It is apparent from Table 2 that, in the Examples 1–5 of the present invention, the residual living cell rate difference is as high as 1.2 or more showing that the residual living cell rate under light irradiation is better than that in dark room whereby they have a photocalytic activity or, when light is irradiated, antibacterial property is improved and also that the residual living cell rate under light irradiation is −2 or less showing an excellent antibacterial property. Especially in Examples 1 and 2, the residual living cell rate difference is as excellent as 1.8 or more showing a quite excellent photocatalytic activity and the residual living cell rate is also as excellent as −2.4 or lower showing a quite excellent antibacterial property. In Example 1 however, since a treatment was carried out under a condition of acidity of as strong as pH 1, fibrous form was a bit disordered in such a way that the single filaments were partially fused each other. In Example 5 where a heat treatment was carried out at 170° C., the fiber was a bit colored.

On the contrary, in Comparative Example 1 where no antibacterially active metal was contained, the product showed no antibacterial property and photocatalytic property at all while, in Comparative Example 2 where antibacterially active metal was contained and in Comparative Example 3 where the heat treatment was carried out at pH 7, antibacterial property was noted to some extent but no photocatalytic property was available.

ADVANTAGE OF THE INVENTION

In the present invention, a heat treatment is carried out for an acrylonitrile fiber containing an antibacterially active metal compound at the pH range of 1–6 whereby there is a significant advantage that an antibacterial acrylonitrile fiber having the so-called photocatalytic activity (where an antibacterial property can be promoted by means of irradiation of light without increasing the amount of the antibacterially active metal compound) can be provided. Utilization of it to clothing, bedclothes, interior products or daily commodities having clearer and more pleasant antibacterial property is expected.

What is claimed is:

1. An antibacterial acrylonitrile fiber having a photocatalytic activity represented by a residual living cell rate difference of 1.2 or more, in which an acrylonitrile fiber containing an antibacterially active metal compound in an amount of 1–200 m.mol/kg as a metal ion is subjected to a heat treatment under a temperature of 95 to 170° C. within a range of pH 1–6.

2. The antibacterial acrylonitrile fiber having a photocatalytic activity according to claim 1, wherein the antibacterially active metal compound is a silver compound.

3. The antibacterial acrylonitrile fiber having a photocatalytic activity according to claim 1, wherein the acrylonitrile fiber contains an anionic functional group.

4. The antibacterial acrylonitrile fiber having a photocatalytic activity according to claim 1, wherein the heat treatment is wet heat or dry heat of 100–160° C.

5. The antibacterial acrylonitrie fiber having a photocatalytic activity according to claim 2, wherein the acrylonitrile fiber contains an anionic functional group.

6. The antibacterial acrylonitrile fiber having a photocatalytic activity according to claim 2, wherein the heat treatment is wet heat or dry heat of 100–160° C.

7. The antibacterial acrylonitrile fiber having a photocatalytic activity according to claim 3, wherein the heat treatment is wet heat or dry heat of 100–160° C.

8. The antibacterial acrylonitrile fiber having a photocatalytic activity according to claim 5, wherein the heat treatment is wet heat or dry heat of 100–160° C.

* * * * *